United States Patent
Smith et al.

(10) Patent No.: US 11,473,957 B2
(45) Date of Patent: Oct. 18, 2022

(54) METER BYPASS ASSEMBLY HAVING A HOUSING INCLUDING VALVE BODIES ROTATIONALLY FIXED TO OPPOSING ENDS OF A SHAFT

(71) Applicant: Georg Fischer Central Plastics LLC, Shawnee, OK (US)

(72) Inventors: Michael D. Smith, Shawnee, OK (US); Thomas G. Veeley, Shawnee, OK (US)

(73) Assignee: Georg Fischer Central Plastics LLC, Shawnee, OK (US)

( * ) Notice: Subject to any disclaimer, the term of this patent is extended or adjusted under 35 U.S.C. 154(b) by 371 days.

(21) Appl. No.: 16/733,012

(22) Filed: Jan. 2, 2020

(65) Prior Publication Data

US 2021/0207986 A1 Jul. 8, 2021

(51) Int. Cl.
*G01F 15/18* (2006.01)
*F16K 11/02* (2006.01)
*G01F 15/00* (2006.01)
*F16K 31/44* (2006.01)
*F16K 11/20* (2006.01)

(52) U.S. Cl.
CPC ............ *G01F 15/185* (2013.01); *F16K 11/02* (2013.01); *F16K 11/20* (2013.01); *F16K 31/44* (2013.01); *G01F 15/005* (2013.01)

(58) Field of Classification Search
None
See application file for complete search history.

(56) References Cited

U.S. PATENT DOCUMENTS

| 804,033 | A |   | 11/1905 | Pederson |
|---|---|---|---|---|
| 1,659,126 | A |   | 2/1928 | Atta |
| 3,296,859 | A |   | 1/1967 | Stewart |
| 3,337,473 | A |   | 6/1968 | Driscoll |
| 3,407,827 | A |   | 10/1968 | Follett |
| 3,788,344 | A |   | 1/1974 | Dyck |
| 4,327,760 | A | * | 5/1982 | Lancaster ............ G01F 15/185 73/201 |
| 4,609,074 | A |   | 9/1986 | Berrend |
| 4,665,941 | A |   | 5/1987 | Hudson |

(Continued)

FOREIGN PATENT DOCUMENTS

| CA | 2591489 A1 | 12/2007 |
|---|---|---|
| CN | 105333312 B | 3/2018 |

(Continued)

*Primary Examiner* — Harshad R Patel
(74) *Attorney, Agent, or Firm* — Harness, Dickey & Pierce, P.L.C.

(57) ABSTRACT

A meter bypass assembly includes a housing and a valve assembly. The housing defines a first inlet and a first outlet, and a second inlet and a second outlet. The valve assembly is rotatable to a first position in which fluid is allowed to flow from the first inlet to the first outlet and from the second inlet to the second outlet. The valve assembly is also rotatable to a second position in which fluid is allowed to flow from the first inlet to the second outlet and is restricted from flowing from the first inlet to the first outlet and from the second inlet to the second outlet. The valve assembly includes a shaft extending in a longitudinal direction of the housing and first and second valve bodies rotationally fixed to opposing ends of the shaft.

21 Claims, 8 Drawing Sheets

(56) References Cited

U.S. PATENT DOCUMENTS

| | | | |
|---|---|---|---|
| 5,785,086 A * | 7/1998 | Boyce | F16K 11/0716 73/201 |
| 5,803,123 A | 9/1998 | Bell et al. | |
| 5,836,340 A | 11/1998 | Daghe et al. | |
| 5,861,556 A | 1/1999 | Nukui et al. | |
| 5,918,624 A | 7/1999 | Young | |
| 5,971,003 A | 10/1999 | Lyall et al. | |
| 6,283,153 B1 * | 9/2001 | Brisco | F16K 11/0853 73/201 |
| 7,034,704 B2 | 4/2006 | Mahowald | |
| 7,328,721 B2 | 2/2008 | Kytola | |
| 7,347,219 B2 * | 3/2008 | Gohde | F16K 11/20 73/201 |
| 8,839,815 B2 | 9/2014 | Young et al. | |
| 9,074,770 B2 | 7/2015 | Young et al. | |
| 9,212,752 B2 | 12/2015 | Gardner | |
| 9,421,559 B2 | 8/2016 | Cornett et al. | |
| 9,557,059 B2 | 1/2017 | Kucera et al. | |
| 10,247,594 B2 | 4/2019 | Smith et al. | |
| 2005/0171645 A1 | 8/2005 | Oswald et al. | |
| 2007/0089791 A1 | 4/2007 | Gohde et al. | |
| 2015/0114490 A1 | 4/2015 | Carpenter | |
| 2017/0145668 A1 | 5/2017 | Salser et al. | |
| 2018/0313682 A1 * | 11/2018 | Smith | F16K 11/065 |
| 2020/0088407 A1 | 3/2020 | Smith et al. | |

FOREIGN PATENT DOCUMENTS

| | | | |
|---|---|---|---|
| EP | 686833 B1 | 8/2001 | |
| EP | 2093545 A1 | 8/2009 | |
| EP | 2098833 A1 | 9/2009 | |
| EP | 2383513 A1 | 11/2011 | |
| EP | 1290412 B1 | 1/2012 | |
| EP | 2763227 A1 | 8/2014 | |
| EP | 1941246 B1 | 9/2014 | |
| EP | 2840364 A1 | 2/2015 | |
| EP | 2869036 A1 | 5/2015 | |
| EP | 2869038 A1 | 5/2015 | |
| EP | 2781892 A4 | 8/2015 | |
| JP | H11287676 A | 10/1999 | |
| JP | 2000146662 A | 5/2000 | |
| JP | 2000249619 A | 9/2000 | |
| JP | 3451078 B2 | 9/2003 | |
| JP | 2004185917 A | 7/2004 | |
| JP | 2005346986 A | 12/2005 | |
| JP | 2006053073 A | 2/2006 | |
| JP | 3982946 B2 | 9/2007 | |
| JP | 2007292393 A | 11/2007 | |
| JP | 2009168651 A | 7/2009 | |
| JP | 2009245132 A | 10/2009 | |
| JP | 2019032205 A | 2/2019 | |
| RU | 2130591 C1 | 5/1999 | |
| WO | WO-1997014945 A1 | 4/1997 | |
| WO | WO-2011067923 A1 | 6/2011 | |
| WO | WO 2018/230658 * | 12/2018 | F16K 11/076 |

* cited by examiner

METER BYPASS ASSEMBLY HAVING A HOUSING INCLUDING VALVE BODIES ROTATIONALLY FIXED TO OPPOSING ENDS OF A SHAFT

FIELD

The present disclosure relates to a bypass assembly for a gas meter.

BACKGROUND

This section provides background information related to the present disclosure and is not necessarily prior art.

A conventional gas meter is associated with a building and delivers fluid such as natural gas to appliances (e.g., furnace, water heater, gas stove, etc.) disposed inside or outside the building to operate such appliances. When performing maintenance on the gas meter, gas delivered to the building is shut off, which prevents the ability of occupants of the building to operate such appliances. The present disclosure provides a bypass assembly for gas meters, which allows gas to be delivered to the building notwithstanding maintenance being performed on the gas meters. The bypass assembly of the present disclosure may also be retrofitted on existing gas meters associated with the building.

SUMMARY

This section provides a general summary of the disclosure, and is not a comprehensive disclosure of its full scope or all of its features.

In one form, the present disclosure provides a meter bypass assembly that includes a housing and a valve assembly. The housing defines a first inlet and a first outlet, and a second inlet and a second outlet. The valve assembly is mounted within the housing. The valve assembly is rotatable between a first position in which fluid is allowed to flow from the first inlet to the first outlet and from the second inlet to the second outlet, and a second position in which fluid is allowed to flow from the first inlet to the second outlet and is restricted from flowing from the first inlet to the first outlet and from the second inlet to the second outlet. The valve assembly includes a shaft and first and second valve bodies. The shaft extends in a longitudinal direction of the housing. The first and second valve bodies are rotationally fixed to opposing ends of the shaft.

In some configurations of the bypass assembly of the above paragraph, the first valve body includes a first passageway and the second valve body includes a second passageway.

In some configurations of the bypass assembly of any one or more of the above paragraphs, the first passageway is rotationally aligned with the first inlet and the first outlet when the valve assembly is in the first position so that fluid is allowed to flow from the first inlet to the first outlet. The second passageway is rotationally aligned with the second inlet and the second outlet when the valve assembly is in the first position so that fluid is allowed to flow from the second inlet to the second outlet.

In some configurations of the bypass assembly of any one or more of the above paragraphs, the first passageway is rotationally misaligned with the first inlet and the first outlet when the valve assembly is in the second position so that fluid is restricted from flowing from the first inlet to the first outlet. The second passageway is rotationally misaligned with the second inlet and the second outlet when the valve assembly is in the second position so that fluid is restricted from flowing from the second inlet to the second outlet.

In some configurations of the bypass assembly of any one or more of the above paragraphs, the first valve body defines a first channel and the second valve body defines a second channel. Fluid flows from the first inlet to the second outlet via the first and second channels when the valve assembly is in the second position.

In some configurations of the bypass assembly of any one or more of the above paragraphs, the first channel is formed in an outer cylindrical surface of the first valve body and the second channel is formed in an outer cylindrical surface of the second valve body.

In some configurations of the bypass assembly of any one or more of the above paragraphs, the valve assembly is rotatable to a third position in which a first portion of fluid flows from the first inlet to the first outlet and from the second inlet to the second outlet. A second portion of fluid flows from the first inlet to the second outlet via a bypass passageway located between the first and second valve bodies.

In some configurations of the bypass assembly of any one or more of the above paragraphs, an actuator rotationally fixed to one of the first and second valve bodies and configured to rotate the valve assembly between the first and second positions.

In some configurations of the bypass assembly of any one or more of the above paragraphs, the actuator is located externally to the housing.

In another form, the present disclosure provides a meter bypass assembly for a gas meter that includes a housing and a valve assembly. The housing defines a first inlet and a first outlet, and a second inlet and a second outlet. The valve assembly is mounted within the housing and rotatably supported by the housing. The valve assembly rotatable between a first position in which fluid is allowed to flow from the first inlet to the first outlet and from the second inlet to the second outlet, and a second position in which fluid is allowed to flow from the first inlet to the second outlet and is restricted from flowing from the first inlet to the first outlet and from the second inlet to the second outlet. The valve assembly includes a shaft and first and second valve bodies. The first and second valve bodies are fixed to opposing ends of the shaft such that rotation of one of the first and second valve bodies in a first rotational direction rotates the other of the first and second valve bodies in the first rotational direction. The first valve body includes a first passageway and the second valve body includes a second passageway. The shaft extends perpendicular to the first and second passageways.

In some configurations of the bypass assembly of the above paragraph, a first annular recess is formed in an outer cylindrical surface of the first valve body and around a first end of the first passageway, and a second annular recess is formed in the outer cylindrical surface of the first valve body and around a second end of the first passageway that is opposite the first end.

In some configurations of the bypass assembly of any one or more of the above paragraphs, the second annular recess is diametrically opposed to the first annular recess.

In some configurations of the bypass assembly of any one or more of the above paragraphs, first and second sealing members are disposed in the first and second annular recesses, respectively, and sealingly engaged with the housing.

In some configurations of the bypass assembly of any one or more of the above paragraphs, a third annular recess is formed in the outer cylindrical surface of the first valve body and between the first and second annular recesses.

In some configurations of the bypass assembly of any one or more of the above paragraphs, a third sealing member is disposed in the third annular recess and is sealingly engaged with the housing.

In some configurations of the bypass assembly of any one or more of the above paragraphs, the first valve body defines a first groove formed in and extending around the outer cylindrical surface of the first valve body. The second valve body defines a second groove formed in and extending around an outer cylindrical surface of the second valve body.

In some configurations of the bypass assembly of any one or more of the above paragraphs, first and second sealing members are disposed in the first and second grooves, respectively, and are sealingly engaged with the housing.

In some configurations of the bypass assembly of any one or more of the above paragraphs, the first groove is positioned outwardly along the first valve body relative to the first and second recesses.

In yet another form, the present disclosure provides a gas meter apparatus including a bypass assembly and a gas meter. The bypass assembly includes a housing and a valve assembly. The housing defines a first inlet and a first outlet, and a second inlet and a second outlet. The valve assembly is rotatable between a first position in which fluid is allowed to flow from the first inlet to the first outlet and from the second inlet to the second outlet, and a second position in which fluid is allowed to flow from the first inlet to the second outlet and is restricted from flowing from the first inlet to the first outlet and from the second inlet to the second outlet. The valve assembly includes a shaft, a first valve body and a second valve body. The first valve body is coupled to an end of the shaft and defines a first passageway and a first channel. The second valve body is coupled to another end of the shaft and defines a second passageway and a second channel. When the valve assembly is in the first position, the first inlet, the first outlet and the first passageway forms a first fluid path and the second inlet, the second outlet and the second passageway forms a second fluid path. When the valve assembly is in the second position, the first inlet, the first and second channels, the second outlet and a bypass passageway defines a third fluid path. The shaft is positioned within the bypass passageway. The gas meter has an inlet port in fluid communication with the first outlet and an outlet port in fluid communication with the second inlet.

In some configurations of the bypass assembly of the above paragraph, the bypass passageway is positioned between the first and second valve bodies.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
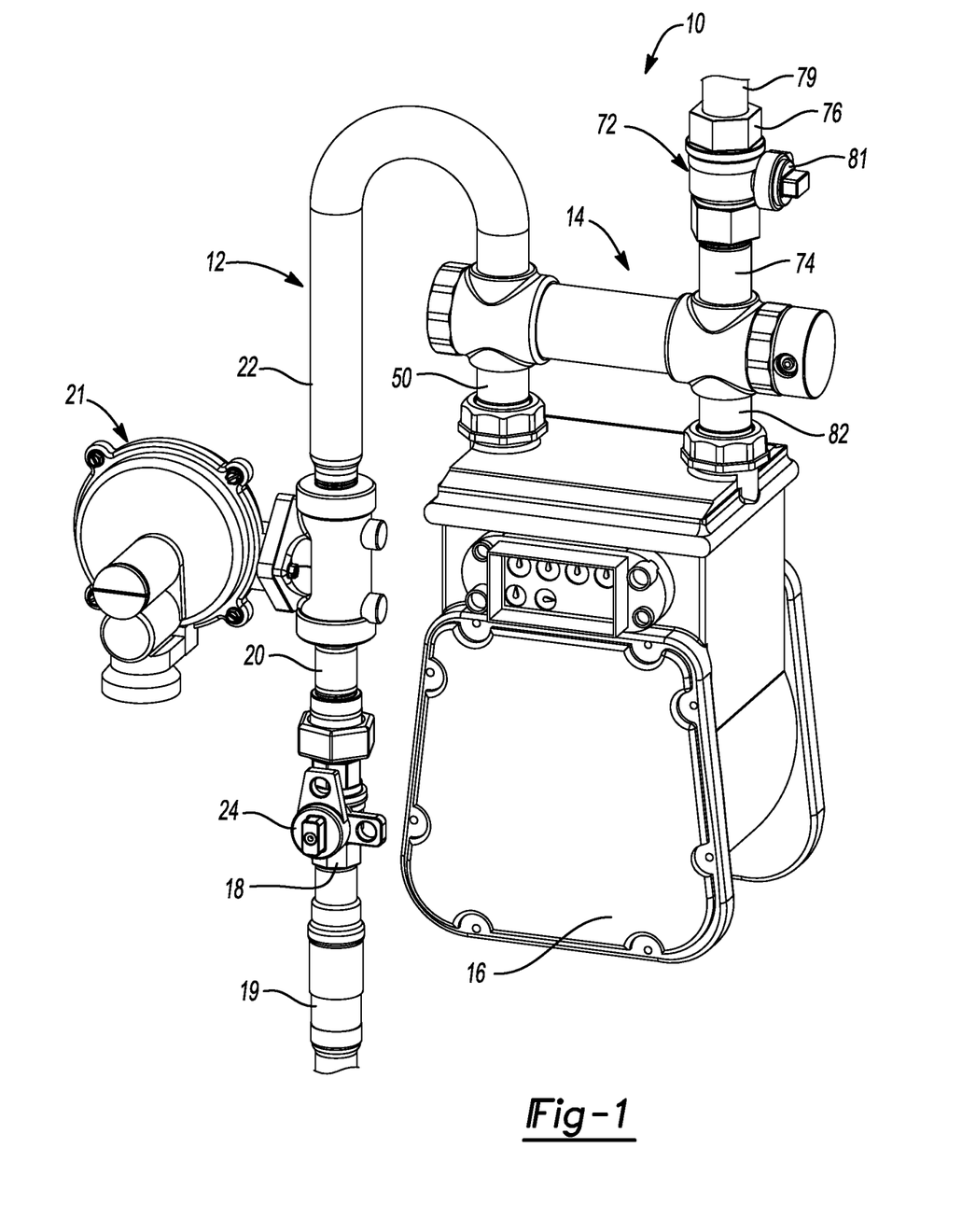
FIG. 1 is a perspective view of a gas meter apparatus including a gas meter and a bypass assembly according to the principles of the present disclosure.

As shown in FIG. 1, a gas meter apparatus 10 is provided. The gas meter apparatus 10 may be associated with a building (e.g., house, school, store, etc.) and may provide fluid such as natural gas to appliances (e.g., furnace, gas stove, fireplace, water heater, etc.) disposed inside or outside the building to operate such appliances. The gas meter apparatus 10 may include a piping assembly 12, a bypass assembly 14 and a gas meter 16. As will be described in more detail below, the gas meter apparatus 10 is operable in an open mode, a bypass mode or a purge mode.

The piping assembly 12 may include an inlet fitting 18, a first pipe 20, a pressure regulator 21 and a second pipe 22. The inlet fitting 18 may be in fluid communication with a gas supply (not shown) via a service line 19 that is disposed underground. The inlet fitting 18 may also be coupled to the service line 19 and the first pipe 20. The inlet fitting 18 may include a valve 24 that is operable between a closed position and an open position. In this way, gas from the gas supply is allowed to flow through the inlet fitting 18 to the first pipe 20 when the valve 24 is in the open position, and is prevented from flowing through the inlet fitting 18 to the first pipe 20 when the valve 24 is in the closed position.

The pressure regulator 21 is coupled to the first pipe 20 and the second pipe 22 and allows gas to flow from the first pipe 20 to the second pipe 22. The pressure regulator 21 is configured to regulate pressure of the gas flowing from the gas supply into the building. The second pipe 22 is coupled to the bypass assembly 14 and allows gas to flow from the second pipe 22 to the bypass assembly 14.

Figure 6:
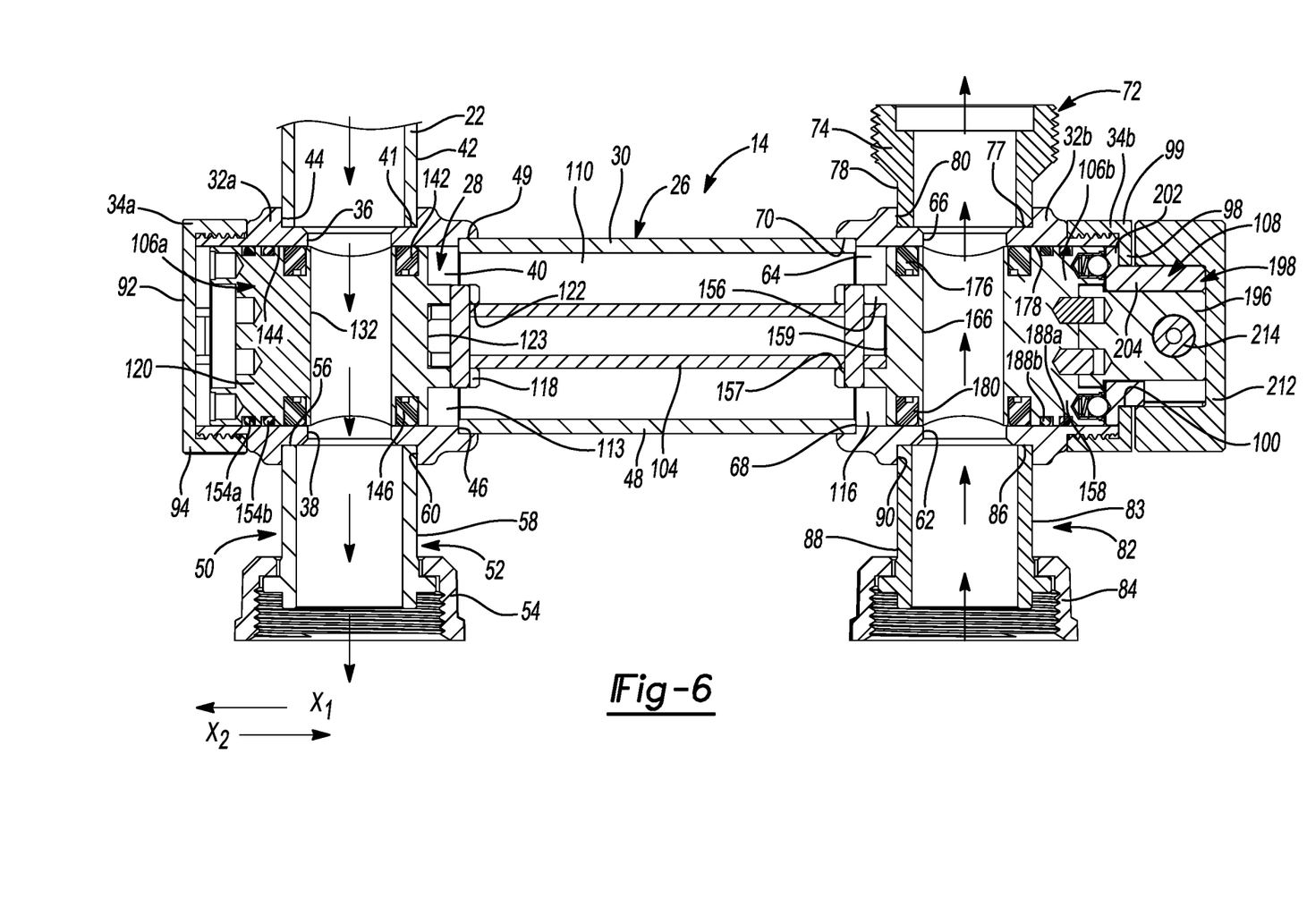
FIG. 6 is a cross-sectional view of the bypass assembly with the valve assembly in an open position.
Figure 7:
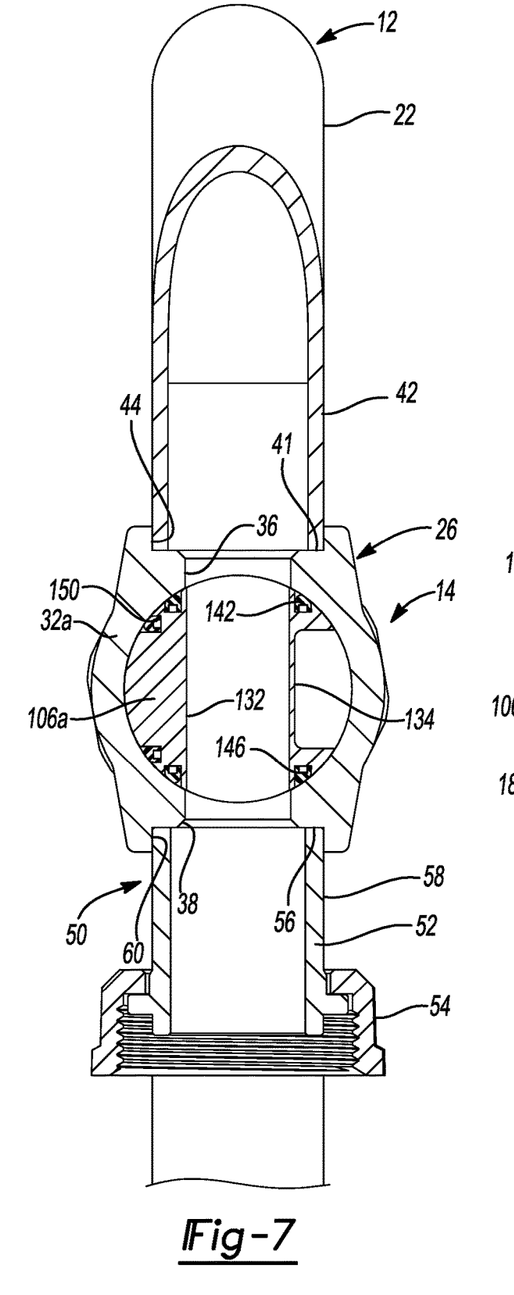
FIG. 7 is another cross-sectional view of the bypass assembly with the valve assembly in the open position.
Figure 8:
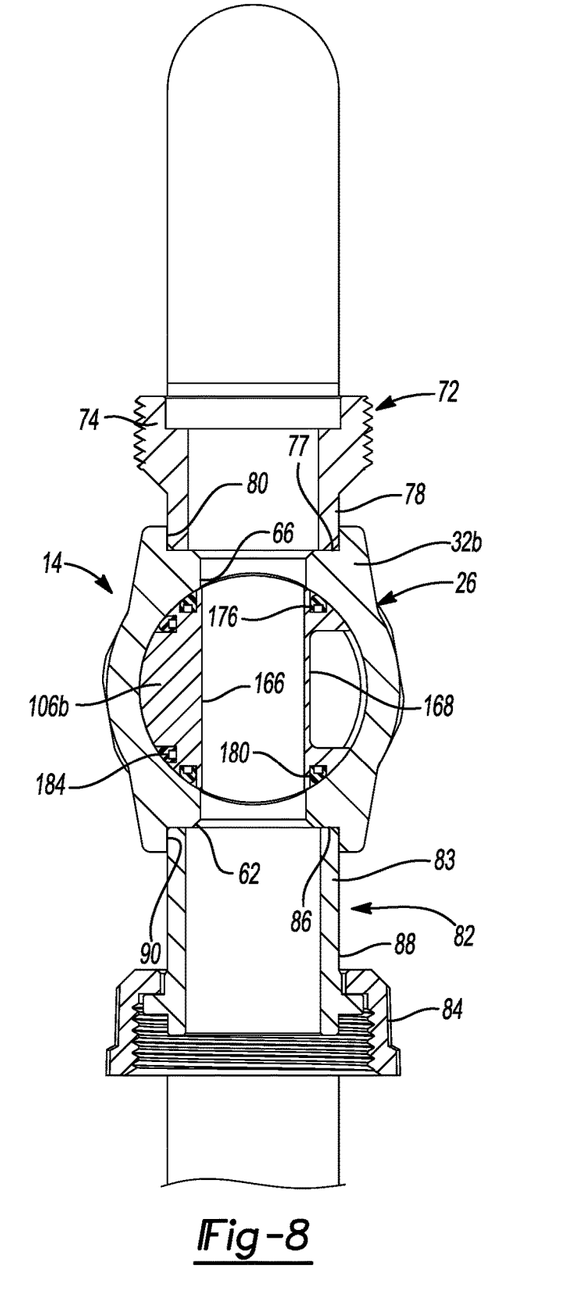
FIG. 8 is another cross-sectional view of the bypass assembly with the valve assembly in the open position.
Figure 9:
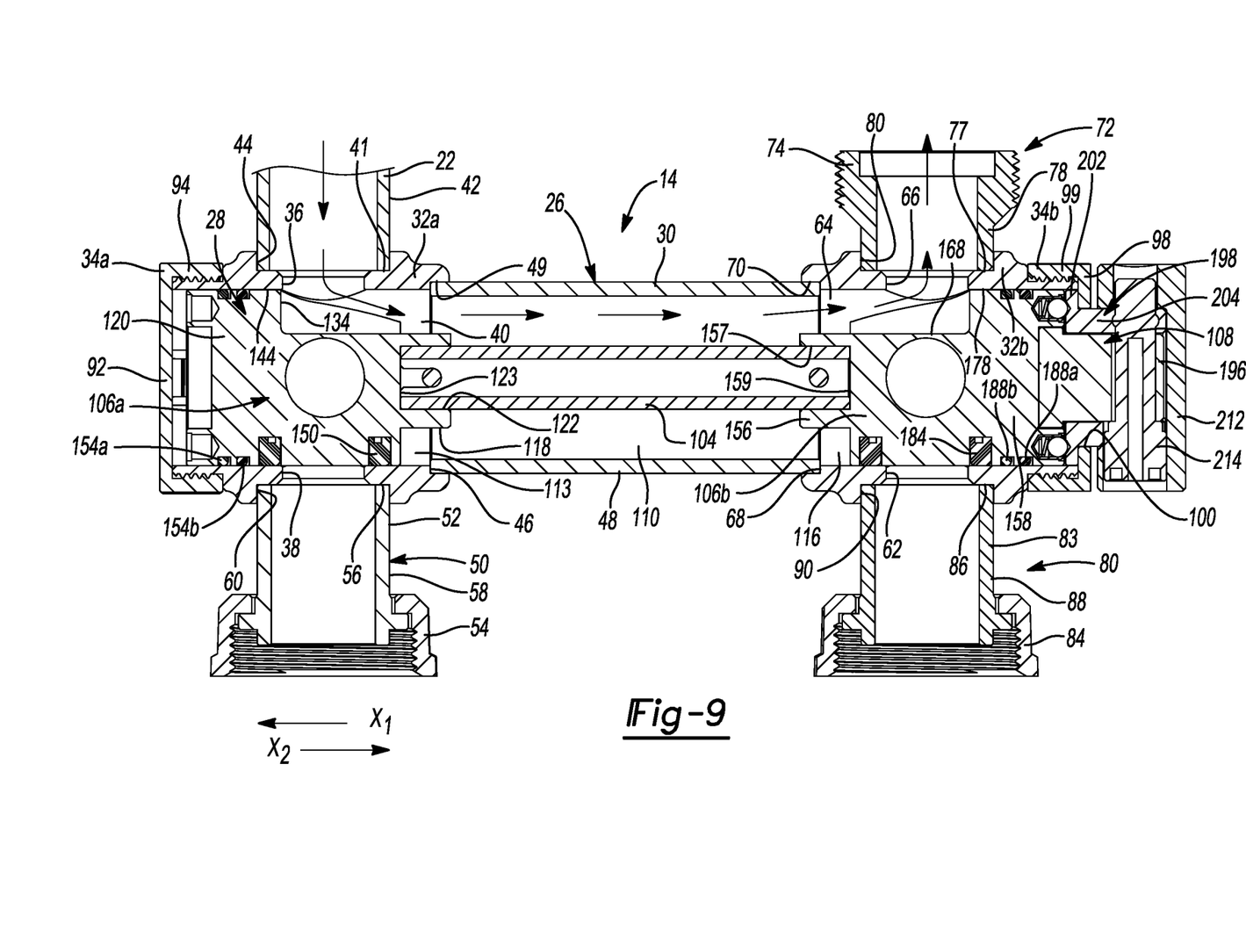
FIG. 9 is a cross-section view of the bypass assembly similar to FIG. 6 but with the valve assembly in a bypass position.

With reference to FIGS. 1-11, the bypass assembly 14 includes a housing 26 (FIGS. 1-3 and 6-11) and a valve assembly 28 (FIGS. 2-6 and 9). The housing 26 includes a cylindrical-shaped intermediate section 30, a pair of end sections 32a, 32b and a pair of caps 34a, 34b. As shown in FIGS. 6 and 9, the end section 32a may be coupled (e.g., welded) to a first end of the intermediate section 30 and may include an inlet 36, a first outlet 38 and a second outlet 40. The inlet 36 and the first outlet 38 may be opposite each other. The second pipe 22 may be coupled to the end section 32a at the inlet 36. That is, the second pipe 22 is positioned in a seat 41 formed in the end section 32a at the inlet 36 such that a cylindrical surface 42 of the second pipe 22 is sealingly engaged with an annular wall 44 of the seat 41. The first end of the intermediate section 30 may be coupled to the end section 32a at the second outlet 40. That is, the first end of the intermediate section 30 is positioned in a seat 46 formed in the end section 32a at the second outlet 40 such that a cylindrical surface 48 of the intermediate section 30 is sealingly engaged with an annular wall 49 of the seat 46.

As shown in FIGS. 2, 3 and 6-9, a first gas-meter fitting assembly 50 may be coupled to the end section 32a and may include a pipe 52 and a fitting 54. The pipe 52 may be coupled (e.g., welded) to the end section 32a at the first outlet 38. That is, the pipe 52 is positioned in a seat 56 formed in the end section 32a at the first outlet 38 such that a cylindrical surface 58 of the pipe 52 is sealingly engaged with an annular wall 60 of the seat 56. The fitting 54 is coupled to the pipe 52 and is also engaged (e.g., threadably engaged) with an inlet port of the gas meter 16.

As shown in FIGS. 6 and 9, the end section 32b may be coupled (e.g., welded) to a second end of the intermediate section 30 that is opposite the first end and may include a first inlet 62, a second inlet 64 and an outlet 66. The first inlet 62 and the outlet 66 may be opposite each other. The second end of the intermediate section 30 may be coupled to the end section 32b at the second inlet 64. That is, the second end of the intermediate section 30 is positioned in a seat 68 formed in the end section 32b at the second inlet 64 such that the cylindrical surface 48 of the intermediate section 30 is sealingly engaged with an annular wall 70 of the seat 68.

A fitting assembly 72 may be coupled to the end section 32b and may include a pipe 74 and a fitting 76. The pipe 74 may be coupled (e.g., welded) to the end section 32b at the outlet 66. That is, the pipe 74 is positioned in a seat 77 formed in the end section 32b at the outlet 66 such that a cylindrical surface 78 of the pipe 74 is sealingly engaged with an annular wall 80 of the seat 77. The pipe 74 may also be threadably engaged with the fitting 76. The fitting 76 may be coupled to a gas line 79 that extends into the building and may include a valve 81 that is operable between a closed position and an open position. In this way, gas flowing through the gas meter apparatus 10 is allowed to flow through the fitting 76 and into the building when the valve 81 is in the open position, and is prevented from flowing through the fitting 76 and into the building when the valve 81 is in the closed position.

A second gas-meter fitting assembly 82 may be coupled to the end section 32b and may include a pipe 83 and a fitting 84. The pipe 83 may be coupled (e.g., welded) to the end section 32b at the first inlet 62. That is, the pipe 83 is positioned in a seat 86 formed in the end section 32b at the first inlet 62 such that a cylindrical surface 88 of the pipe 83 is sealingly engaged with an annular wall 90 of the seat 86. The fitting 84 is coupled to the pipe 83 and is also engaged (e.g., threadably engaged) with an outlet port of the gas meter 16.

As shown in FIGS. 6 and 9, the cap 34a is engaged (e.g., threadably engaged) with an end of the end section 32a (i.e., the end of the end section 32a is opposite the second outlet 40) and restricts movement of the valve assembly 28 in a first axial direction X1. The cap 34a includes a base 92 and a sidewall 94 extending from and around the base 92. An inner circumferential surface of the sidewall 94 includes threads that engage threads at the end of the end section 32a.

The cap 34b is engaged (e.g., threadably engaged) with an end of the end section 32b (i.e., the end of the end section 32b is opposite the second inlet 64) and restricts movement of the valve assembly 28 in a second axial direction X2 that is opposite the first axial direction X1. The cap 34b includes a base 98 and a sidewall 99 extending from and around the base 98. The base 98 defines an opening 100 extending through a middle portion thereof. An inner circumferential surface of the sidewall 99 includes threads that engage threads at the end of the end section 32a.

Figure 10:
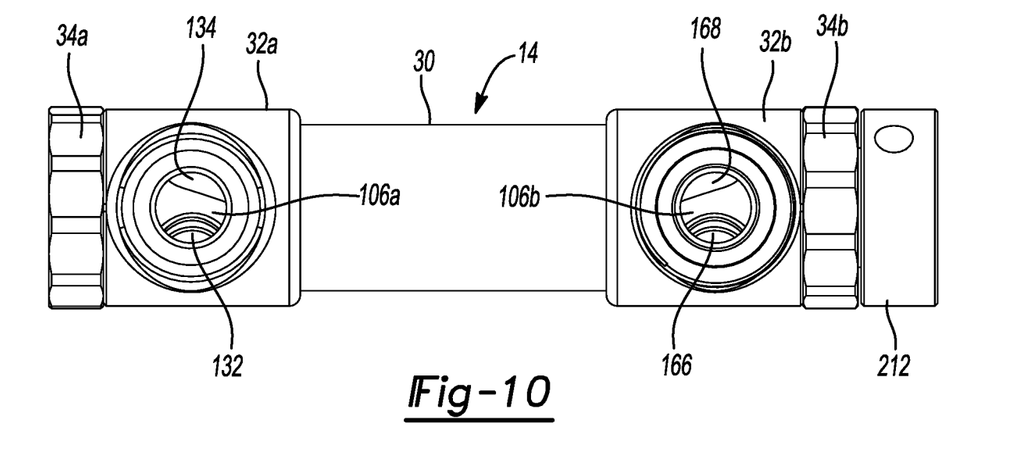
FIG. 10 is a cross-sectional view of the bypass assembly with the valve assembly in a purge position.
Figure 11:
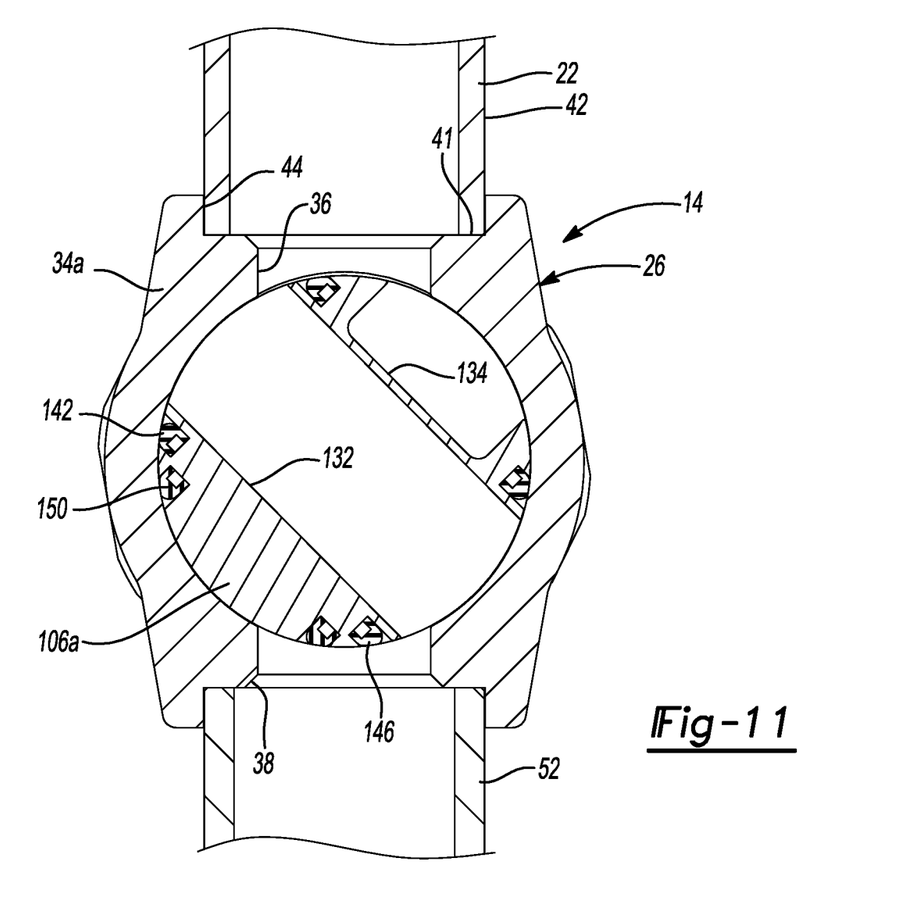
FIG. 11 is another cross-sectional view of the bypass assembly with the valve assembly in the purge position.

The valve assembly 28 is mounted within the housing 26 and is rotatably supported by the housing 26. The valve assembly 28 is rotatable between a first position (FIG. 6), a second position (FIG. 9) and a third position (FIGS. 10 and 11). The gas meter apparatus 10 is in the open mode when the valve assembly 28 is in the first position. In this way, gas is allowed to flow from the inlet 36 of the end section 32a to the first outlet 38 of the end section 32a, and from the first inlet 62 of the end section 32b to the outlet 66 of the end section 32b.

The gas meter apparatus 10 is in the bypass mode when the valve assembly 28 is in the second position. In this way, gas is allowed to flow from the inlet 36 of the end section 32a to the outlet 66 of the end section 32b (i.e., bypassing the gas meter 16), and is restricted from flowing from the inlet 36 of the end section 32a to the first outlet 38 of the end section 32a and from the first inlet 62 of the end section 32b to the outlet 66 of the end section 32b.

The gas meter apparatus 10 is in the purge mode when the valve assembly 28 is in the third position. In this way, a first portion of gas is allowed to flow from the inlet 36 of the end section 32a to the first outlet 38 of the end section 32a, and from the first inlet 62 of the end section 32b to the outlet 66 of the end section 32b. A second portion of gas is allowed to flow from the inlet 36 of the end section 32a to the outlet 66 of the end section 32b (via the intermediate section 30 thereby bypassing the gas meter 16).

As shown in FIGS. 2-6 and 9, the valve assembly 28 includes a shaft 104, first and second valve bodies 106a, 106b and an actuator 108. The shaft 104 is disposed in a cavity 110 of the intermediate section 30 and extends in a direction parallel to the housing 26 (i.e., axis of the shaft 104 extends parallel relative to the longitudinal direction of the housing 26). A first end of the shaft 104 may extend at least partially into a cavity 113 of the end section 32a and a second end of the shaft 104 that is opposite the first end may extend at least partially into a cavity 116 of the end section 32b.

The first valve body 106a may be disposed in the cavity 113 of the end section 32a and may be rotatably supported by the end section 32a. The first valve body 106a may also be rotationally fixed to the first end of the shaft 104 such that rotation of the shaft 104 in a rotational direction causes corresponding rotation of the first valve body 106a in the rotational direction. The first valve body 106a may include a hub portion 118 and a valve body portion 120.

The hub portion 118 defines a cavity 122 (FIGS. 2, 6 and 9) that receives the first end of the shaft 104. The first end of the shaft 104 may abut against a wall 123 of the cavity 122 to prevent further movement of the shaft 104 in the axial direction. The hub portion 118 may also define apertures 124 (FIG. 2) that are diametrically opposed to each other and that are aligned with slots 126 of the first end of the shaft 104. In this way, a pin 130 may extend through the apertures 124 and the slots 126, thereby rotationally fixing the first valve body 106a and the shaft 104 to each other.

The valve body portion 120 may be cylindrically-shaped and may define a passageway 132 and a channel 134. The passageway 132 extends through the valve body portion 120 (i.e., extends in a direction perpendicular relative to the shaft 104). The passageway 132 is rotationally aligned with the inlet 36 of the end section 32a and the first outlet 38 of the end section 32a when the valve assembly 28 is in the first position so that gas is allowed to flow from the inlet 36 to the first outlet 38 via the passageway 132. The passageway 132 is rotationally misaligned with the inlet 36 of the end section 32a and the first outlet 38 of the end section 32a when the valve assembly 28 is in the second position so that gas is restricted from flowing from the inlet 36 to the first outlet 38.

Figure 2:
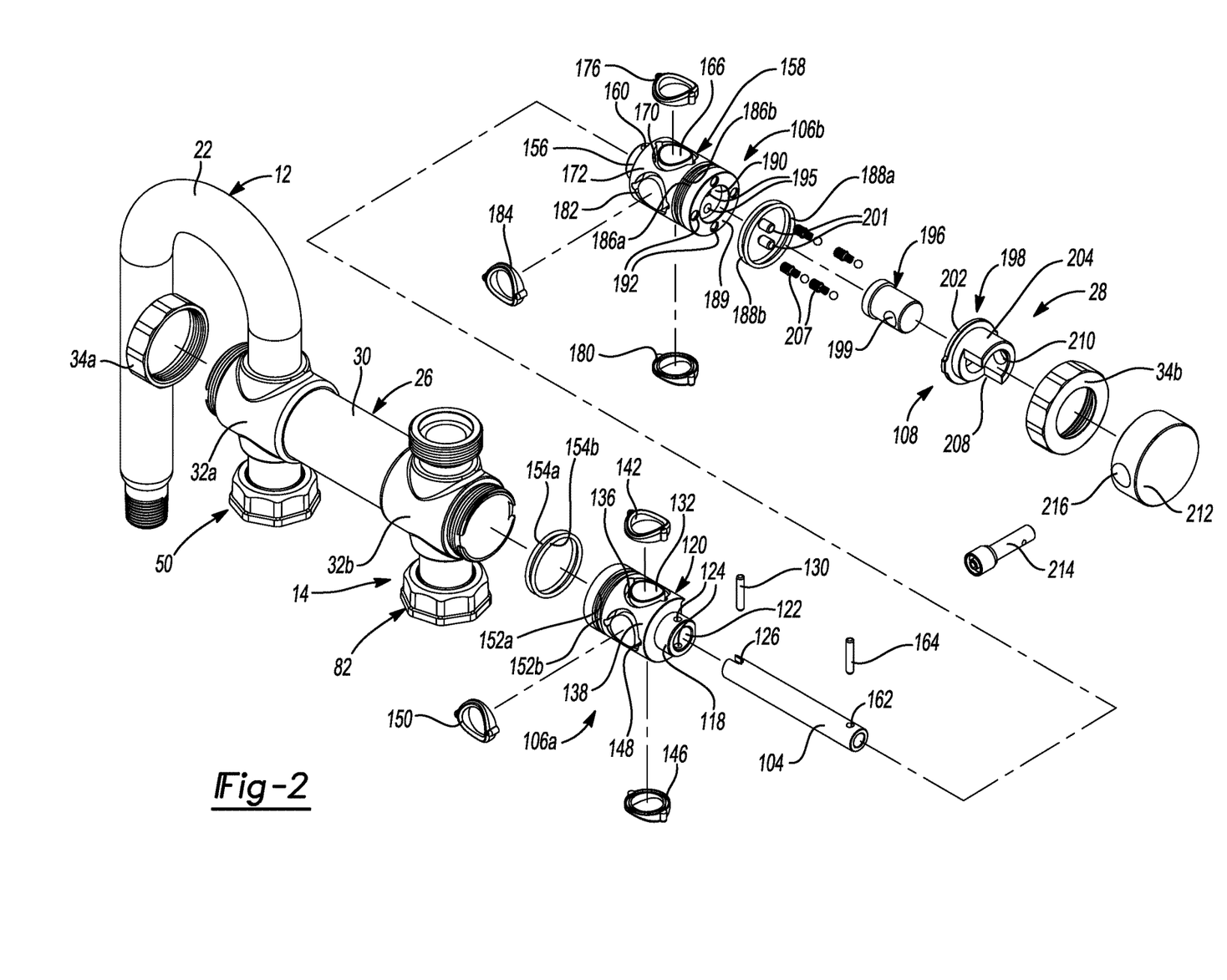
FIG. 2 is an exploded view of a valve assembly of the bypass assembly of FIG. 1.
Figure 3:
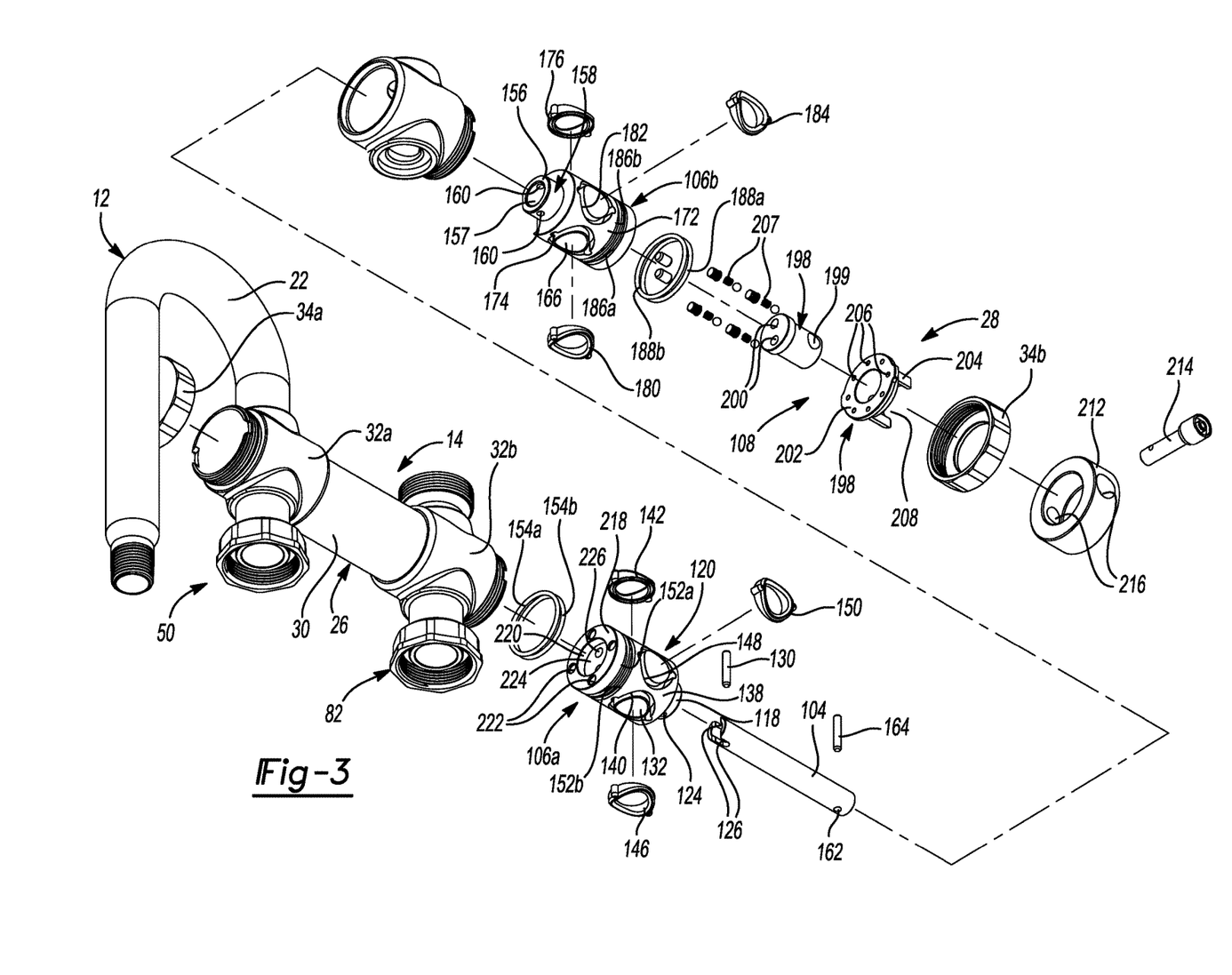
FIG. 3 is another exploded view of the valve assembly.
Figures 4, 5:
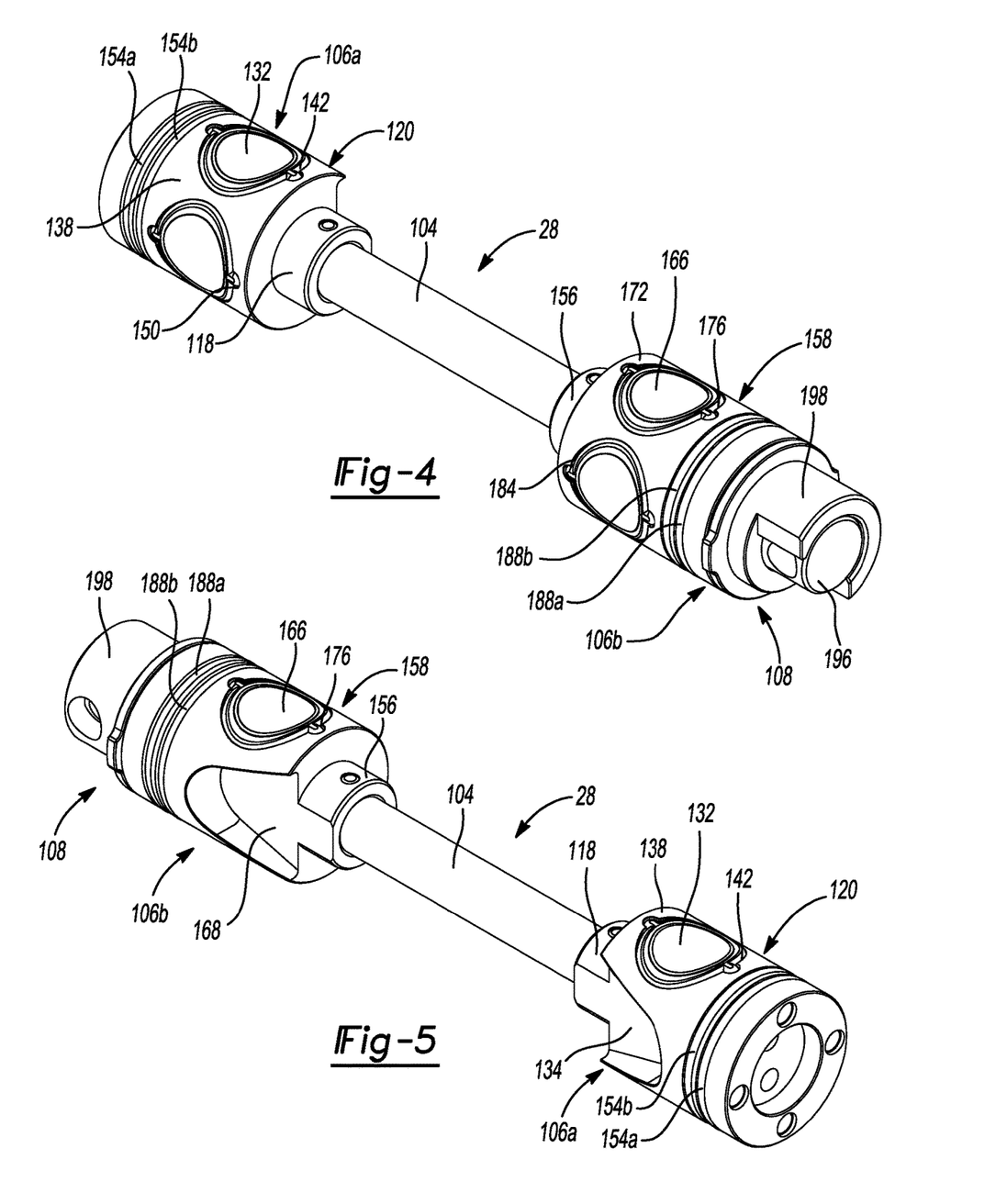
FIG. 4 is a perspective view of the valve assembly assembled.
FIG. 5 is another perspective view of the valve assembly assembled.

A first annular recess 136 is formed in an outer cylindrical surface 138 of the first valve body portion 120 and around a first end of the passageway 132 (FIG. 2). A second annular recess 140 is formed in the outer cylindrical surface 138 of the first valve body portion 120 and around a second end of the passageway 132 that is opposite the first end (FIG. 3). The second annular recess 140 is diametrically opposed to the first annular recess 136.

As shown in FIG. 6, a first sealing member 142 may be disposed in the first annular recess 136 and may be sealingly engaged with an inner cylindrical surface 144 of the end portion 32a, and a second sealing member 146 may be disposed in the second annular recess 140 and may be sealingly engaged with the inner cylindrical surface 144 of the end portion 32a. In this way, gas flowing from the inlet 36 to the first outlet 38 via the passageway 132 is prevented from leaking out.

A third annular recess 148 is formed in the outer cylindrical surface 138 of the end portion 32a and between the first and second annular recesses 136, 140 (FIGS. 2 and 3; the third annular recess 148 is positioned 90 degrees from the first and second annular recesses 136, 140). A third sealing member 150 may be disposed in the third annular recess 148 and may be sealingly engaged with the inner cylindrical surface 144 of the end portion 32a (FIG. 9). In this way, when the valve assembly 28 is in the second position, fluid is prevented from leaking through the first outlet 38 of the end section 32a.

A plurality of grooves 152a, 152b are formed in and extending around the outer cylindrical surface 138 the valve body portion 120. The grooves 152a, 152b may be positioned at or near an axial end of the valve body portion 120 (i.e., the grooves 152a, 152b are positioned outwardly along the valve body portion 120 relative to the first, second and third annular recesses 136, 140, 148 and the passageway 132). A plurality of sealing members 154a, 154b (O-rings) are disposed in the grooves 152a, 152b and are sealingly engaged with the inner cylindrical surface 144 of the end portion 32a. The channel 134 is formed in the outer cylindrical surface 138 of the valve body portion 120 and between the first and second annular recesses 136, 140 (i.e., the channel 134 is positioned 90 degrees from the first and second annular recesses 136, 140).

The second valve body 106b may be disposed in the cavity 116 of the end section 32b and may be rotatably supported by the end section 32b. The second valve body 106b may also be rotationally fixed to the second end of the shaft 104 such that rotation of the second valve body 106b in a rotational direction causes corresponding rotation of the shaft 104 and the first valve body 106a in the rotational direction. The second valve body 106b may include a hub portion 156 and a valve body portion 158.

As shown in FIGS. 3, 6 and 9, the hub portion 156 defines a cavity 157 that receives the second end of the shaft 104. The second end of the shaft 104 may abut against a wall 159 of the cavity 157 to prevent further movement of the shaft 104 in the axial direction. The hub portion 156 may also define apertures 160 that are diametrically opposed to each other and that are aligned with apertures 162 of the second end of the shaft 104. In this way, a pin 164 may extend through the apertures 160 and the apertures 162, thereby rotationally fixing the second valve body 106b and the shaft 104 to each other.

The valve body portion 158 may be cylindrically-shaped and may define a passageway 166 and a channel 168. The passageway 166 extends through the valve body portion 158 (i.e., extends in a direction perpendicular relative to the shaft 104). The passageway 166 is rotationally aligned with the first inlet 62 of the end section 32b and the outlet 66 of the end section 32b when the valve assembly 28 is in the first position so that gas is allowed to flow from the first inlet 62 to the outlet 66 via the passageway 166. The passageway 166 is rotationally misaligned with the first inlet 62 of the end section 32b and the outlet 66 of the end section 32b when the valve assembly 28 is in the second position so that gas is restricted from flowing from the first inlet 62 to the outlet 66.

A first annular recess 170 is formed in an outer cylindrical surface 172 of the valve body portion 158 and around a first end of the passageway 166. A second annular recess 174 is formed in the outer cylindrical surface 172 of the first valve body portion 158 and around a second end of the passageway 166 that is opposite the first end. The second annular recess 174 is diametrically opposed to the first annular recess 170.

A first sealing member 176 may be disposed in the first annular recess 170 and may be sealingly engaged with an inner cylindrical surface 178 of the end portion 32b, and a second sealing member 180 may be disposed in the second annular recess 174 and may be sealingly engaged with the inner cylindrical surface 178 of the end portion 32b. In this way, gas flowing from the first inlet 62 to the outlet 66 via the passageway 166 is prevented from leaking out.

A third annular recess 182 is formed in the outer cylindrical surface 172 of the end portion 32b and between the first and second annular recesses 170, 174 (i.e., the third annular recess 182 is positioned 90 degrees from the first and second annular recesses 170, 174). A third sealing member 184 may be disposed in the third annular recess 182 and may be sealingly engaged with the inner cylindrical surface 178 of the end portion 32b. In this way, when the valve assembly 28 is in the second position, fluid is prevented from leaking through the first inlet 62 of the end section 32b.

A plurality of grooves 186a, 186b are formed in and extending around the outer cylindrical surface 172 the valve body portion 158. The grooves 186a, 186b may be positioned at or near an axial end of the valve body portion 158 (i.e., the grooves 186a, 186b are positioned outwardly along the valve body portion 158 relative to the first, second and third annular recesses 170, 174, 182 and the passageway 166). A plurality of sealing members 188a, 188b (O-rings) are disposed in the grooves 186a, 186b and are sealingly engaged with the inner cylindrical surface 178 of the end portion 32b.

The channel 168 is horizontally aligned with the channel 134 of the first valve body 106a thereby facilitating the flow of gas from the inlet 36 of the end portion 32a to the outlet 66 of the end portion 32b when the valve assembly 28 is in the second and third positions. The channel 168 is formed in the outer cylindrical surface 172 of the valve body portion 158 and between the first and second annular recesses 170, 174 (i.e., the channel 168 is positioned 90 degrees from the first and second annular recesses 170, 174).

As shown in FIG. 2, an axial end surface 189 of the valve body portion 158 includes a recess 190 formed in a middle portion thereof and a plurality of equally spaced apart apertures 192 around the recess 190. A bottom surface of the recess 190 includes a plurality of apertures 195 formed therein.

The actuator 108 may be rotationally fixed to the second valve body 106b such that rotation of the actuator 108 in a rotation direction causes corresponding rotation of the second valve body 106b, the shaft 104 and the first valve body 106a in the same rotational direction. The actuator 108 may be operable to rotate the valve assembly 28 in the first, second and third positions.

As shown in FIGS. 2 and 3, the actuator 108 includes a cylindrically-shaped first member 196 and a second member 198. The first member 196 is at least partially disposed in the recess 190 of the second valve body 106b and extends through the opening 100 of the cap 34b such that a portion of the first member 196 is located external relative to the housing 26 (FIGS. 6 and 9). The first member 196 includes a first aperture 199 extending therethrough (i.e., the first aperture 199 extends perpendicular to the longitudinal direction of the housing 26) and a plurality of second apertures 200 extending perpendicular to the first aperture 199 (i.e., the second apertures 200 extend parallel to the longitudinal direction of the housing 26). A plurality of pins 201 are received in the second apertures 200 and in the apertures 195 of the valve body portion 158, thereby rotationally fixing the first member 196 and the second valve body 106b to each other.

The second member 198 includes a flange 202 and a sidewall 204. The flange 202 extends radially outwardly from an end of the sidewall 204 that is disposed in the cavity 116 of the end section 32b, and is positioned between the second valve body 106b and the end cap 34b. In this way, axial movement of the second member 198 is prevented. The flange 202 includes a plurality of apertures 206 formed therein. A plurality of pins mechanisms 207 are received in the apertures 206 of the flange 202 and in the apertures 192 of the second valve body 106b, thereby rotationally fixing the second member 198 and the second valve body 106b to each other.

The sidewall 204 extends through the opening 100 of the cap 34b such that a portion of the sidewall 204 is located externally relative to the housing 26. The sidewall 204 defines an opening 208 and an aperture 210 extending therethrough (i.e., the opening 208 and the aperture 210 are located externally relative to the housing 26). A cover 212 may be disposed over the first and second members 196, 198. A locking pin 214 may extend through openings 216 of the cover 212, the opening 208 of the sidewall 204, the aperture 210 of the sidewall 204 and the first aperture 199 of the first member 196, thereby preventing removal of the cover 212 and actuation of the actuator 108.

It should be understood that although the actuator 108 is shown and described coupled to the second valve body 106b, the actuator 108 may be coupled to the first valve body 106a in a similar or identical fashion. That is, the valve body portion 120 of the first valve body 106a may include an axial end surface 218 having a recess 220 formed in a middle portion thereof and a plurality of equally spaced apart apertures 222 around the recess 220. Further, a bottom surface 224 of the recess 220 may include a plurality of apertures 226 formed therein. In this way, the bypass assembly 14 may operate whether the first valve body 106a is disposed in the end section 32a and the second valve body 106b is disposed in the end section 32b, or the first valve body 106a is disposed in the end section 32b and the second valve body 106b is disposed in the end section 32a.

With reference to FIGS. 1-11, operation of the bypass assembly 14 will now be described in detail. When operating the gas meter apparatus 10 in the open mode, the valve assembly 28 is rotated to the first position. That is, the actuator 108 is rotated such that the passageway 132 of the valve body 106a is aligned with the inlet 36 and the first outlet 38, and the passageway 166 of the valve body 106b is aligned with the first inlet 62 and the outlet 66. In this way, gas is allowed to flow from the pipe assembly 12 to the gas meter 16 (via the inlet 36 of the end section 32a, the passageway 132 of the first valve body 106a, the first outlet 38 of the end section 32a and the first gas-meter fitting assembly 50). From the gas meter 16, gas flows to the appliances in the building (via the second gas-meter fitting assembly 82, the first inlet 62 of the end section 32b, the passageway 166 of the second valve body 106b, the outlet 66 of the end section 32b and the fitting assembly 72). The bypass assembly 14 may be operated in the open mode to allow gas to flow to appliances associated with a building while measuring (via the gas meter 16) the volume of gas flowing to such appliances.

When the operating the gas meter apparatus 10 in the bypass mode, the valve assembly 28 is rotated to the second position. That is, the actuator 108 is rotated such that the passageway 132 of the valve body 106a is misaligned with the inlet 36 and the first outlet 38, and the passageway 166 of the valve body 106b is misaligned with the first inlet 62 and the outlet 66. In this way, gas is allowed to flow from the pipe assembly 12 directly to the appliances in the building (i.e., bypassing the gas meter 16). That is, gas from the pipe assembly 12 flows to the appliances in the building via the inlet 36 of the end section 32a, the channel 134 of the first valve body 106a, the cavity 110 of the intermediate section 30, the channel 168 of the second valve body 106b, the outlet 66 of the end section 32b and the fitting assembly 72. When the valve assembly 28 is in the second position, gas is restricted from flowing from the inlet 36 of the end section 32a to the first outlet 38 of the end section 32a and from the first inlet 62 of the end section 32b to the outlet 66 of the section 32b. The bypass assembly 14 may be operated in the bypass mode to allow gas to flow to appliances associated with a building while the gas meter 16 is being serviced by a technician, for example.

When the operating the gas meter apparatus 10 in the purge mode, the valve assembly 28 is rotated to the third position. That is, the actuator 108 is rotated such that a portion of the passageway 132 and a portion of the channel 134 are both aligned with the inlet 36 and the first outlet 38, and a portion of the passageway 166 and a portion of the channel 168 are both aligned with the first inlet 62 and the outlet 66. In this way, a first portion of gas is allowed to flow from the pipe assembly 12 to the gas meter 16 and from the gas meter 16 to the appliances in the building. A second portion of gas is allowed to flow from the pipe assembly 12 directly to the appliances in the building (i.e., bypassing the gas meter 16). The bypass assembly 14 may be operated in the purge mode to allow gas to flow to appliances associated with a building while purging the gas meter 16 of air, for example. This may need to be done when the gas meter 16 has been serviced or a new gas meter 16 is being installed.

One of the benefits of the bypass assembly 14 described in the present disclosure is that gas may still be provided to the building to operate the appliances when the gas meter 16 is being repaired by a technician. Another benefit of the bypass assembly 14 of the present disclosure is that the bypass assembly 14 is allowed to be retrofitted to existing gas meters associated with buildings.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A meter bypass assembly comprising:
   a housing defining a first inlet and a first outlet, and a second inlet and a second outlet; and
   a valve assembly mounted within the housing, the valve assembly being rotatable between a first position in which fluid is allowed to flow from the first inlet to the first outlet and from the second inlet to the second outlet, and a second position in which fluid is allowed to flow from the first inlet to the second outlet and is restricted from flowing from the first inlet to the first outlet and from the second inlet to the second outlet,
   the valve assembly including:
      a shaft extending in a longitudinal direction of the housing; and
      first and second valve bodies rotationally fixed to opposing ends of the shaft.

2. The meter bypass assembly of claim 1, wherein the first valve body includes a first passageway and the second valve body includes a second passageway.

3. The meter bypass assembly of claim 2, wherein the first passageway is rotationally aligned with the first inlet and the first outlet when the valve assembly is in the first position so that fluid is allowed to flow from the first inlet to the first outlet, and wherein the second passageway is rotationally aligned with the second inlet and the second outlet when the valve assembly is in the first position so that fluid is allowed to flow from the second inlet to the second outlet.

4. The meter bypass assembly of claim 2, wherein the first passageway is rotationally misaligned with the first inlet and the first outlet when the valve assembly is in the second position so that fluid is restricted from flowing from the first inlet to the first outlet, and wherein the second passageway is rotationally misaligned with the second inlet and the second outlet when the valve assembly is in the second position so that fluid is restricted from flowing from the second inlet to the second outlet.

5. The meter bypass assembly of claim 2, wherein the first valve body defines a first channel and the second valve body defines a second channel, and wherein fluid flows from the first inlet to the second outlet via the first and second channels when the valve assembly is in the second position.

6. The meter bypass assembly of claim 5, wherein the first channel is formed in an outer cylindrical surface of the first valve body and the second channel is formed in an outer cylindrical surface of the second valve body.

7. The meter bypass assembly of claim 1, wherein the valve assembly is rotatable to a third position in which a first portion of fluid flows from the first inlet to the first outlet and from the second inlet to the second outlet, and wherein a second portion of fluid flows from the first inlet to the second outlet via a bypass passageway located between the first and second valve bodies.

8. The meter bypass assembly of claim 1, further comprising an actuator rotationally fixed to one of the first and second valve bodies and configured to rotate the valve assembly between the first and second positions.

9. The meter bypass assembly of claim 8, wherein the actuator is located externally to the housing.

10. A meter bypass assembly for a gas meter, the meter bypass assembly comprising:
   a housing defining a first inlet and a first outlet, and a second inlet and a second outlet; and
   a valve assembly mounted within the housing and rotatably supported by the housing, the valve assembly rotatable between a first position in which fluid is allowed to flow from the first inlet to the first outlet and from the second inlet to the second outlet, and a second position in which fluid is allowed to flow from the first inlet to the second outlet and is restricted from flowing from the first inlet to the first outlet and from the second inlet to the second outlet,
   the valve assembly including:
      a shaft; and
      first and second valve bodies fixed to opposing ends of the shaft such that rotation of one of the first and second valve bodies in a first rotational direction rotates the other of the first and second valve bodies in the first rotational direction, the first and second valve bodies include first and second passageways, respectively,
   wherein the shaft extends perpendicular to the first and second passageways.

11. The meter bypass assembly of claim 10, wherein a first annular recess is formed in an outer cylindrical surface of the first valve body and around a first end of the first passageway, and a second annular recess is formed in the outer cylindrical surface of the first valve body and around a second end of the first passageway that is opposite the first end.

12. The meter bypass assembly of claim 11, wherein the second annular recess is diametrically opposed to the first annular recess.

13. The meter bypass assembly of claim 11, further comprising first and second sealing members disposed in the first and second annular recesses, respectively, and sealingly engaged with the housing.

14. The meter bypass assembly of claim 11, wherein a third annular recess is formed in the outer cylindrical surface of the first valve body and between the first and second annular recesses.

15. The meter bypass assembly of claim 14, further comprising a third sealing member disposed in the third annular recess and sealingly engaged with the housing.

16. The meter bypass assembly of claim 11, wherein the first valve body has at least a first groove formed in and extending around the outer cylindrical surface of the first valve body, and wherein the second valve body has at least a second groove formed in and extending around an outer cylindrical surface of the second valve body.

17. The meter bypass assembly of claim 16, further comprising first and second sealing members disposed in the first and second grooves, respectively, and sealingly engaged with the housing.

18. The meter bypass assembly of claim 16, wherein the first groove is positioned outwardly along the first valve body relative to the first and second recesses.

19. A gas meter apparatus comprising:
   a bypass assembly including:
      a housing defining a first inlet and a first outlet, and a second inlet and a second outlet; and
      a valve assembly rotatable between a first position in which fluid is allowed to flow from the first inlet to the first outlet and from the second inlet to the second outlet, and a second position in which fluid is allowed to flow from the first inlet to the second outlet and is restricted from flowing from the first inlet to the first outlet and from the second inlet to the second outlet,
      the valve assembly including:
         a shaft;
         a first valve body coupled to an end of the shaft and defining a first passageway and a first channel; and
         a second valve body coupled to another end of the shaft and defining a second passageway and a second channel;
         wherein when the valve assembly is in the first position, the first inlet, the first outlet and the first passageway forms a first fluid path and the second inlet, the second outlet and the second passageway forms a second fluid path,
         wherein when the valve assembly is in the second position, the first inlet, the first and second channels, the second outlet and a bypass passageway defines a third fluid path, and
         wherein the shaft is positioned within the bypass passageway; and
   a gas meter having an inlet port in fluid communication with the first outlet and an outlet port in fluid communication with the second inlet.

20. The gas meter apparatus of claim 19, wherein the bypass passageway is positioned between the first and second valve bodies.

21. The gas meter apparatus of claim 20 which further comprises:
   an actuator located at one end of the housing, the actuator being connected to an end of the shaft, and the actuator being configured to rotate the shaft to simultaneously rotate the first valve body and second valve body from the first position to the second position wherein, in the second position, gas is continued to be supplied to the second outlet while bypassing the gas meter to permit maintenance of the gas meter while continuing to supply gas to an end user.

* * * * *